United States Patent
Xu et al.

(10) Patent No.: US 11,646,950 B2
(45) Date of Patent: May 9, 2023

(54) MANAGEMENT SERVICE MANAGEMENT METHOD AND APPARATUS

(71) Applicant: Huawei Technologies Co., Ltd., Shenzhen (CN)

(72) Inventors: Ruiyue Xu, Shanghai (CN); Kai Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/170,088

(22) Filed: Feb. 8, 2021

(65) Prior Publication Data
US 2021/0168053 A1 Jun. 3, 2021

Related U.S. Application Data

(63) Continuation of application No. PCT/CN2019/099867, filed on Aug. 8, 2019.

(30) Foreign Application Priority Data

Aug. 9, 2018 (CN) .......................... 201810905179.3

(51) Int. Cl.
G06F 15/173 (2006.01)
H04L 41/5041 (2022.01)
G06F 8/65 (2018.01)

(52) U.S. Cl.
CPC ............ *H04L 41/5041* (2013.01); *G06F 8/65* (2013.01)

(58) Field of Classification Search
None
See application file for complete search history.

(56) References Cited

U.S. PATENT DOCUMENTS

2017/0054595 A1 2/2017 Zhang et al.
2017/0171752 A1 6/2017 Lee et al.
(Continued)

FOREIGN PATENT DOCUMENTS

CN 102932219 A 2/2013
CN 107040481 A 8/2017
(Continued)

OTHER PUBLICATIONS

Huawei, Adding usecase and requirements of network slice subnet template information querying. 3GPP TSG SA WG5 (Telecom Management) Meeting #117, Jan.-Feb. 2, 2018, Rome, Italy, S5-181393, revision of S5-181155, 3 pages.

(Continued)

*Primary Examiner* — Brian Whipple
*Assistant Examiner* — Gregory P Tolchinsky
(74) *Attorney, Agent, or Firm* — Conley Rose, P.C.

(57) ABSTRACT

A management service management method includes receiving, by a management service function unit, a management service query request from a first management function unit, where the management service query request carries management service requirement information, and the management service requirement information includes at least one of the following requirement information of an operation, requirement information of a managed object, or requirement information of management data, determining, by the management service function unit, a first management service corresponding to the management service requirement information, and sending description information of the first management service to the first management function unit, where the description information of the first management service includes description information of the operation, description information of the managed object, (Continued)

and description information of the management data that correspond to the first management service.

24 Claims, 8 Drawing Sheets

(56) References Cited

U.S. PATENT DOCUMENTS

| | | | |
|---|---|---|---|
| 2019/0261184 A1 | 8/2019 | Xu et al. | |
| 2019/0327317 A1 | 10/2019 | Lu et al. | |
| 2020/0037386 A1* | 1/2020 | Park | H04W 76/18 |
| 2020/0305033 A1* | 9/2020 | Keller | H04L 65/1016 |
| 2021/0092639 A1* | 3/2021 | Larsson | H04L 41/5096 |
| 2021/0306875 A1* | 9/2021 | Zhang | H04W 24/04 |
| 2021/0385286 A1* | 12/2021 | Wang | H04L 67/16 |
| 2021/0410057 A1* | 12/2021 | Abtin | H04W 60/00 |

FOREIGN PATENT DOCUMENTS

| | | | |
|---|---|---|---|
| CN | 107623578 | A | 1/2018 |
| CN | 107682159 | A | 2/2018 |
| CN | 107925587 | A | 4/2018 |
| CN | 108024270 | A | 5/2018 |
| CN | 108092789 | A | 5/2018 |
| CN | 108270823 | A | 7/2018 |
| CN | 108282351 | A | 7/2018 |

OTHER PUBLICATIONS

3GPP TS 28.531 V1.2.2 (Aug. 2018);3rd Generation Partnership Project;Technical Specification Group Services and System Aspects;Management and orchestration of 5G networks;Provisioning;(Release 15),total 51 pages.
3GPP TS 28.532 V0.4.0 (Jul. 2018);3rd Generation Partnership Project Technical Specification Group Services and System Aspects;Management and orchestration of networks and network slicing;Provisioning;Stage 2 and stage 3 (Release 15),total 45 pages.
3GPP TS 28.533 V0.5.1 (Aug. 2018);3rd Generation Partnership Project;Technical Specification Group and System Aspects;Management and orchestration; Architecture framework (Release 15),total 21 pages.
3GPP TS 28.541 V1.1.0 (Jul. 2018);3rd Generation Partnership Project Technical Specification Group Services and System Aspects;Management and orchestration of 5G networks;Network Resource Model (NRM);Stage 2 and stage 3 (Release 15 );total 123 pages.
3GPP TS 28.545 V0.5.2 (Aug. 2018);3rd Generation Partnership Project;Technical Specification Group Services and System Aspects; Management and orchestration of 5G networks;Fault Supervision (FS);(Release 15),total 25 pages.
3GPP TS 28.550 V1.2.2 (Aug. 2018);3rd Generation Partnership Project;Technical Specification Group Services and System Aspects;Management and orchestration of 5G networks;Performance assurance(Release 15),total 48 pages.
3GPP TS 28.552 V0.5.2 (Aug. 2018);3rd Generation Partnership Project Technical Specification Group Services and System Aspects;Management and orchestration of 5G networks;Performance measurements and assurance data (Release 15),total 31 pages.
3GPP TS 28.554 V1.2.2 (Aug. 2018);3rd Generation Partnership Project Technical Specification Group Services and System Aspects;Telecommunication management;Management and orchestration of 5G networks;5G End to end Key Performance Indicators (KPI) (Release 15),total 15 pages.
3GPP TS 32.425 V15.1.0 (Jun. 2018);3rd Generation Partnership Project;Technical Specification Group Services and System Aspects;Telecommunication management;Performance Management (PM);Performance measurements Evolved Universal Terrestrial Radio Access Network (E-UTRAN) (Release 15),total 93 pages.
3GPP TS 28.533 V0.4.0, "3rd Generation Partnership Project; Technical Specification Group and System Aspects Management and orchestration; Architecture framework (Release 15)," Jun. 2018, 21 pages.
3GPP TS 28.530 V1.2.0, "3rd Generation Partnership Project; Technical Specification Group Services and System Aspects; Telecommunication management; Management and orchestration of 5G networks; Concepts, use cases and requirements (Release 15)," Jul. 2018, 31 pages.
3GPP TR 28.801 V15.1.0, "3rd Generation Partnership Project; Technical Specification Group Services and System Aspects; Telecommunication management; Study on management and orchestration of network slicing for next generation network (Release 15)," Jan. 2018, 75 pages.
"Service-Based Architecture in 5G, NGMN Alliance," GPP TSG CT WG4 #82, C4-181209, Jan. 19, 2018, 20 pages.

* cited by examiner

MANAGEMENT SERVICE MANAGEMENT METHOD AND APPARATUS

CROSS-REFERENCE TO RELATED APPLICATIONS

This application is a continuation of International Patent Application No. PCT/CN2019/099867 filed on Aug. 8, 2019, which claims priority to Chinese Patent Application No. 201810905179.3 filed on Aug. 9, 2018. The disclosures of the aforementioned applications are hereby incorporated by reference in their entireties.

TECHNICAL FIELD

Embodiments of the present disclosure relate to the field of communications technologies, and in particular, to a management service management method and apparatus.

BACKGROUND

With development of fifth generation (5G) communications technologies, a 5G network management system tends to be service-oriented. To be specific, different management functions (MF) may be deployed for different network functions according to requirements, and the MFs may externally provide management services (MS).

In the service-oriented 5G network management system, there are a plurality of MF instances, each MF instance may provide a plurality of MS instances, and functions of the MS instances are different. In addition, in the service-oriented architecture, flexible deployment (including addition, deletion, or modification) of an MS is preferred. Specifically, it is expected that an MF instance in the network can be flexibly deployed, or an MS instance provided by an MF instance can be flexibly deployed.

To resolve the foregoing problem, a method for flexibly managing and orchestrating a management service in the 5G network management system is urgently needed.

SUMMARY

This application provides a management service management method and apparatus, to implement flexible management of a management service.

To achieve the foregoing objectives, the following technical solutions are used in this application.

According to a first aspect, this application provides a management service management method. The method may include receiving, by a management service function unit, a management service query request from a first management function unit, where the management service query request carries management service requirement information, and the management service requirement information includes at least one of the following requirement information of an operation, requirement information of a managed object, or requirement information of management data, determining, by the management service function unit, a first management service corresponding to the management service requirement information, and sending, by the management service function unit, description information of the first management service to the first management function unit, where the description information of the first management service includes description information of the operation, description information of the managed object, and description information of the management data that correspond to the first management service.

According to the management service management method provided in this application, the first management function unit may send the management service query request to the management service function unit, to query the description information of the first management service corresponding to a second management function unit. Because the management service function unit may manage description information of management services, and management function units may mutually access the description information of the management services by using the management service function unit, the management services can be flexibly managed.

In a first optional implementation of the first aspect, before the receiving, by a management service function unit, a management service query request from a first management function unit, the management service management method provided in this application may further include receiving, by the management service function unit, a management service registration request sent by a second management function unit, where the management service registration request carries the description information of the first management service.

In this application, the second management function unit registers a management service with the management service function unit. In this way, description information of the management service corresponding to the second management function unit may be stored in the management service function unit, so that another management function unit (for example, the first management function unit) may query the description information of the management service corresponding to the second management function unit on the management service function unit.

In a second optional implementation of the first aspect, the management service management method provided in this application may further include, if the management service registration request further carries an identifier of the first management service, sending, by the management service function unit, the identifier of the first management service to the first management function unit.

In a third optional implementation of the first aspect, after the receiving, by the management service function unit, a management service registration request sent by a first management function unit, the management service management method provided in this application may further include allocating, by the management service function unit, an identifier of the first management service to the first management service, and sending, by the management service function unit, the identifier of the first management service to the first management function unit.

In this application, the management service function unit sends the identifier of the first management service to the first management function unit. In this way, in a subsequent process of updating the description information of the first management service or deregistering the first management service, the first management function unit may synchronously update or delete the description information of the first management service based on the identifier of the first management service.

In a fourth optional implementation of the first aspect, the management service management method provided in this application may further include receiving, by the management service function unit, a management service update request sent by the second management function unit, where the management service update request carries the identifier of the first management service and update information of the first management service, and the update information of the first management service includes at least one piece of information in the description information of the first management service.

In this application, when the description information of the first management service changes (for example, information is added to the description information or the description information is deleted), the second management function unit corresponding to the first management service may add the update information of the first management service to the management service update request, and send the management service update request to the management service function unit, so that the management service function unit can update the description information of the first management service in the management service function unit, to keep synchronization of the description information of the first management service.

According to a second aspect, this application provides a management service management method. The method may include sending, by a first management function unit, a management service query request to a management service function unit, where the management service query request is used to instruct to query description information of a management service, the management service query request carries management service requirement information, and the management service requirement information includes at least one of the following requirement information of an operation, requirement information of a managed object, or requirement information of management data, and receiving, by the first management function unit, description information of a first management service sent by the management service function unit, where the description information of the first management service includes description information of the operation, description information of the managed object, and description information of the management data that correspond to the first management service.

For descriptions of technical effects of the second aspect, refer to the descriptions of the technical effects of the first aspect. Details are not described herein again.

In a first optional implementation of the second aspect, the management service management method provided in this application may further include receiving, by the first management function unit, a management service update notification sent by the management service function unit, where the management service update notification carries an identifier of the first management service and update information of the first management service, and the update information of the first management service includes at least one piece of information in the description information of the first management service.

In this application, when the description information of the first management service is updated, the management service function unit simultaneously notifies the first management function unit that the first management service has been updated. In this way, synchronization of the description information of the first management service on the first management function unit can be kept.

According to a third aspect, this application provides a management service management method. The method may include sending, by a management function unit, a management service registration request to a management service function unit, where the management service registration request carries description information of a first management service corresponding to the management function unit, and the description information of the first management service includes description information of an operation, description information of a managed object, and description information of management data that correspond to the first management service, and receiving, by the management function unit, a management service registration acknowledgement message sent by the management service function unit.

According to the management service management method provided in this application, the description information of the first management service may be stored in the management service function unit by using a registration procedure of the management function unit, and the management service function unit flexibly manages the description information of the first management service.

In a first optional implementation of the third aspect, the management service management method provided in this application may further include sending, by the management function unit, a management service update request to the management service function unit, where the management service update request carries an identifier of the first management service and update information of the first management service, and the update information of the first management service includes at least one piece of information in the description information of the first management service.

According to a fourth aspect, this application provides a management service function unit, including a receiving module, a determining module, and a sending module, where the receiving module is configured to receive a management service query request from a first management function unit, where the management service query request carries management service requirement information, and the management service requirement information includes at least one of the following requirement information of an operation, requirement information of a managed object, or requirement information of management data, the determining module is configured to determine a first management service corresponding to the management service requirement information, and the sending module is configured to send description information of the first management service to the first management function unit, where the description information of the first management service includes description information of the operation, description information of the managed object, and description information of the management data that correspond to the first management service.

In a first optional implementation of the fourth aspect, the receiving module is further configured to, before receiving the management service query request from the first management function unit, receive a management service registration request sent by a second management function unit, where the management service registration request carries the description information of the first management service.

In a second optional implementation of the fourth aspect, the sending module is further configured to send, if the management service registration request further carries an identifier of the first management service, the identifier of the first management service to the first management function unit.

In a third optional implementation of the fourth aspect, the determining module is further configured to allocate an identifier of the first management service to the first management service, and the sending module is further configured to send the identifier of the first management service to the first management function unit.

In a fourth optional implementation of the fourth aspect, the receiving module is further configured to receive a management service update request sent by the second management function unit, where the management service update request carries the identifier of the first management service and update information of the first management service, and the update information of the first management service includes at least one piece of information in the description information of the first management service.

According to a fifth aspect, this application provides a management function unit, including a sending module and a receiving module, where the sending module is configured to send a management service query request to a management service function unit, where the management service query request is used to instruct to query description information of a management service, the management service query request carries management service requirement information, and the management service requirement information includes at least one of the following requirement information of an operation, requirement information of a managed object, or requirement information of management data, and the receiving module is configured to receive description information of a first management service sent by the management service function unit, where the description information of the first management service includes description information of the operation, description information of the managed object, and description information of the management data that correspond to the first management service.

In a first optional implementation of the fifth aspect, the receiving module is further configured to receive a management service update notification sent by the management service function unit, where the management service update notification carries an identifier of the first management service and update information of the first management service, and the update information of the first management service includes at least one piece of information in the description information of the first management service.

According to a sixth aspect, this application provides a management function unit, including a sending module and a receiving module, where the sending module is configured to send a management service registration request to a management service function unit, where the management service registration request carries description information of a first management service corresponding to the management function unit, and the description information of the first management service includes description information of an operation, description information of a managed object, and description information of management data that correspond to the first management service, and the receiving module is configured to receive a management service registration acknowledgement message sent by the management service function unit.

In a first optional implementation of the sixth aspect, the sending module is further configured to send a management service update request to the management service function unit, where the management service update request carries an identifier of the first management service and update information of the first management service, and the update information of the first management service includes at least one piece of information in the description information of the first management service.

In the first aspect to the sixth aspect, the description information of the first management service further includes at least one of the following user description information of the first management service, version description information of the first management service, provider description information of the first management service, or state description information of the first management service.

In this application, the user description information of the first management service is used to indicate a user of the first management service, the version description information of the first management service is used to indicate a version of the description information of the first management service that can be invoked, the provider description information of the first management service is used to indicate a provider of the description information of the first management service, and the state description information of the first management service is used to indicate that a state of the first management service is available or unavailable.

In the first aspect to the sixth aspect, the description information of the operation corresponding to the first management service includes operation indication information or operation information, and the operation indication information is used to indicate the operation information, the operation indication information includes a type of the first management service, and the type of the first management service includes at least one of the following a lifecycle management service, a fault management service, or a performance management service, operation information indicated by the lifecycle management service includes at least one of the following creating a managed object, deleting a managed object, querying a managed object, modifying a managed object, subscribing to a notification, unsubscribing from a notification, notifying creation of a managed object, notifying deletion of a managed object, or notifying modification of an attribute value of a managed object, operation information indicated by the fault management service includes at least one of the following reading an alarm list, subscribing to an alarm notification, unsubscribing from an alarm notification, notifying a new alarm, notifying rebuilding of an alarm list, notifying an alarm change, acknowledging an alarm, clearing an alarm, notifying a state change, notifying alarm clearance, or unacknowledging an alarm, and operation information indicated by the performance management service includes at least one of the following creating a measurement job, stopping a measurement job, reading a measurement job, notifying file preparation, reading an available file, or notifying a file preparation error.

In the first aspect to the sixth aspect, the description information of the managed object that corresponds to the first management service includes at least one of the following a type of the managed object, a name of the managed object, or a configuration attribute of the managed object, and the type of the managed object includes at least one of the following a network slice, a sub-network, a network function, a type of a network slice, a type of a sub-network, or a type of a network function.

In the first aspect to the sixth aspect, the description information of the management data includes at least one of the following network performance data or network fault data.

According to a seventh aspect, a management service management apparatus is provided. The apparatus includes a processor and a memory coupled to the processor, where the memory is configured to store a computer instruction, and when the management service management apparatus runs, the processor executes the computer instruction stored in the memory, so that the management service management apparatus performs the management service management method according to any one of the first aspect or the optional implementations of the first aspect.

According to an eighth aspect, a computer-readable storage medium is provided. The computer-readable storage medium includes a computer instruction, where when the computer instruction is run by a processor, the management service management method according to any one of the first aspect or the optional implementations of the first aspect is performed.

According to a ninth aspect, a computer program product including an instruction is provided. When the instruction in the computer program product is run by a processor, the management service management method according to any one of the first aspect or the optional implementations of the first aspect is performed.

According to a tenth aspect, a chip is provided. The chip includes at least one processor, an input/output interface, a memory, and a bus, where the memory is configured to store a computer-executable instruction, the at least one processor, the memory, and the input/output interface are connected and communicate with each other by using the bus, and when the chip runs, the at least one processor executes the computer-executable instruction stored in the memory, so that the chip performs the management service management method according to any one of the first aspect or the optional implementations of the first aspect.

According to an eleventh aspect, a management service management apparatus is provided. The apparatus includes a processor and a memory coupled to the processor, where the memory is configured to store a computer instruction, and when the management service management apparatus runs, the processor executes the computer instruction stored in the memory, so that the management service management apparatus performs the management service management method according to any one of the second aspect or the optional implementations of the second aspect.

According to a twelfth aspect, a computer-readable storage medium is provided. The computer-readable storage medium includes a computer instruction, where when the computer instruction is run by a processor, the management service management method according to any one of the second aspect or the optional implementations of the second aspect is performed.

According to a thirteenth aspect, a computer program product including an instruction is provided. When the instruction in the computer program product is run by a processor, the management service management method according to any one of the second aspect or the optional implementations of the second aspect is performed.

According to a fourteenth aspect, a chip is provided. The chip includes at least one processor, an input/output interface, a memory, and a bus, where the memory is configured to store a computer-executable instruction, the at least one processor, the memory, and the input/output interface are connected and communicate with each other by using the bus, and when the chip runs, the at least one processor executes the computer-executable instruction stored in the memory, so that the chip performs the management service management method according to any one of the second aspect or the optional implementations of the second aspect.

According to a fifteenth aspect, a management service management apparatus is provided. The apparatus includes a processor and a memory coupled to the processor, where the memory is configured to store a computer instruction, and when the management service management apparatus runs, the processor executes the computer instruction stored in the memory, so that the management service management apparatus performs the management service management method according to any one of the third aspect or the optional implementations of the third aspect.

According to a sixteenth aspect, a computer-readable storage medium is provided. The computer-readable storage medium includes a computer instruction, where when the computer instruction is run by a processor, the management service management method according to any one of the third aspect or the optional implementations of the third aspect is performed.

According to a seventeenth aspect, a computer program product including an instruction is provided. When the instruction in the computer program product is run by a processor, the management service management method according to any one of the third aspect or the optional implementations of the third aspect is performed.

According to an eighteenth aspect, a chip is provided. The chip includes at least one processor, an input/output interface, a memory, and a bus, where the memory is configured to store a computer-executable instruction, the at least one processor, the memory, and the input/output interface are connected and communicate with each other by using the bus, and when the chip runs, the at least one processor executes the computer-executable instruction stored in the memory, so that the chip performs the management service management method according to any one of the third aspect or the optional implementations of the third aspect.

According to a nineteenth aspect, a management system is provided. The management system includes the management service function unit according to the fourth aspect, the management function unit according to the fifth aspect, and the management function unit according to the sixth aspect.

DESCRIPTION OF EMBODIMENTS

Figure 1:
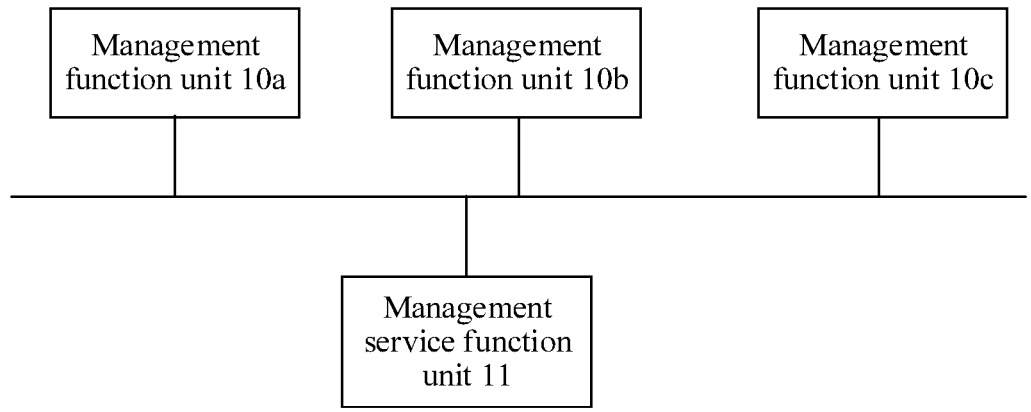
FIG. 1 is a schematic architecture diagram of a network management system according to an embodiment of the present disclosure.

The term "and/or" in this specification describes only an association relationship for describing associated objects and represents that three relationships may exist. For example, A and/or B may represent the following three cases only A exists, both A and B exist, and only B exists.

In the specification and claims in the embodiments of the present disclosure, the terms "first", "second", and so on are intended to distinguish between different objects but do not indicate a particular order of the objects. For example, a first management function unit, a second management function unit, and the like are used to identify different management function units, but are not used to describe a specific sequence of the management function units.

The term "example", "for example", or the like in the embodiments of the present disclosure is used to represent giving an example, an illustration, or a description. Any embodiment or design scheme described as "example" or "for example" in the embodiments of the present disclosure should not be interpreted as being more preferred or having more advantages than another embodiment or design scheme. Exactly, use of the word "example", "for example", or the like is intended to present a related concept in a specific manner.

In the description of the embodiment of the present disclosure, unless otherwise stated, "a plurality of" means two or more than two. For example, a plurality of processing units are two or more processing units, and a plurality of systems are two or more systems.

First, some concepts involved in a management service management method and apparatus provided in the embodiments of the present disclosure are explained and described.

Management function unit. In a New Radio (NR) system, the management function unit is a logical module that implements a management function, integrates a management function (for example, lifecycle management, fault management, and performance management), and externally provides a management service. The management function unit may be a MF. For example, a network slice management function (NSMF) may provide a corresponding management service for all network slices in the NR system. A network slice subnet management function (NSSMF) may provide a corresponding management service for all network slice subnets. A network function management function (NFMF) may provide a corresponding management service for all network functions.

Management service. The management service is an interface that is externally provided by a management function or entity and that can support invoking by other management functions or entities, and represents a service capability. A management function unit may provide one or more management services. Each management service corresponds to description information of the management service. The description information of the management service may also include description information related to lifecycle management, description information related to fault management, and description information related to performance management. Detailed content included in the description information of the management service is described in detail in the following embodiments.

Management service function unit. The management service function unit is configured to comprehensively manage logical modules of all management function units in the NR system, for example, manage the network functions and the network slices described above, and sub-networks, where the sub-network includes a network slice subnet. The management service function unit may be a management service management function (MSMF). The MSMF may store instance information of another function unit or instance information of a management service. For example, the MSMF may store instance information of the management function unit (including instance information of a management service corresponding to the management function unit).

It should be noted that, in the embodiments of the present disclosure, the management function unit may be referred to as an MF, and the management service function unit may be referred to as an MSMF. It should be understood that expressions such as the MF and the MSMF should not be construed as a limitation on the embodiments of the present disclosure. In an actual application, the MF may also be replaced with another name, the MSMF may also be replaced with another name.

Based on the problem existing in the background, the embodiments of the present disclosure provide a management service management method and apparatus. Description information of a management service corresponding to the second management function unit may be stored in the management service function unit, and then the first management function unit may send a management service query request to the management service function unit, to query description information of a first management service corresponding to the second management function unit. Because the management service function unit may manage description information of management services, and management function units may mutually access the description information of the management services by using the management service function unit, the management services can be flexibly managed.

The management service management method and apparatus provided in the embodiments of the present disclosure may be applied to a network management system. FIG. 1 is a schematic architecture diagram of a network management system in an NR system according to an embodiment of the present disclosure. In FIG. 1, the network management system may include at least one management function unit (in FIG. 1, three management function units are used as an example, and are respectively denoted as a management function unit 10a, a management function unit 10b, and a management function unit 10c) and a management service function unit 11. The management service function unit 11 is configured to store information related to the management function unit (for example, instance information of the management function unit and instance information of a management service corresponding to the management function unit). Using the management function unit 10a as an example, managed objects of the management function unit 10a may be various network functions, network slices, sub-networks, or the like. The management function unit 10a may correspond to one management service, for example, lifecycle management, performance management, or fault management, and the management function unit 10a may obtain, by using the management service function unit 11, description information of a management service corresponding to another management function unit (for example, the management function unit 10b in FIG. 1), so that the management function unit 10a may initiate a management service invocation request to the management function unit 10b.

Figure 2:
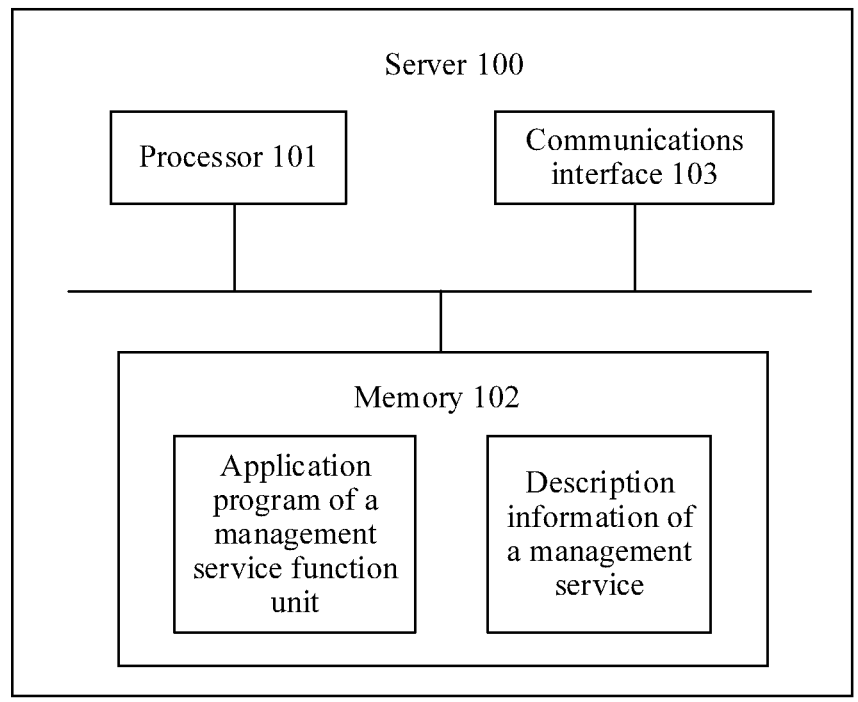
FIG. 2 is a schematic hardware diagram of a server integrated with a management service function unit according to an embodiment of the present disclosure.

In this embodiment of the present disclosure, the management service function unit may be integrated into a server to implement a function of the management service function unit. The following specifically describes, with reference to FIG. 2, components of a server 100 integrated with a management service function unit according to an embodiment of the present disclosure. As shown in FIG. 2, the server 100 may include a processor 101, a memory 102, a communications interface 103, and the like.

Processor 101. The processor 101 is a core component of the server 100, and is configured to run an operating system of the server 100 and an application program (including a system application program and a third-party application program) on the server 100. In this embodiment of the present disclosure, the processor 101 may determine a management service corresponding to management service requirement information.

In this embodiment of the present disclosure, the processor 101 may be specifically a central processing unit (CPU), a general purpose processor, a digital signal processor (DSP), an application-specific integrated circuit (ASIC), a field-programmable gate array (FPGA) or another programmable logic device, a transistor logic device, a hardware component, or any combination thereof. The processor 101 can implement or execute various examples of logical blocks, modules, and circuits described with reference to content disclosed in the embodiments of the present disclosure. Alternatively, the processor may be a combination for implementing a computing function, for example, a combination including one or more microprocessors or a combination of a DSP and a microprocessor.

Memory 102. The memory 102 may be configured to store a software program and module. The processor 101 runs the software program and module that are stored in the memory 102, to execute various function applications of the server 100 and process data. The memory 102 may include one or more computer-readable storage media. The memory 102 includes a program storage area and a data storage area. The program storage area may store an operating system, an application program required by at least one function (for example, an application program of a management service function unit), and the like. The data storage area may store data created by the server 100. In this embodiment of the present disclosure, the memory 102 may further store description information of a management service of a management function unit.

In this embodiment of the present disclosure, the memory 102 may specifically include a volatile memory such as a random-access memory (RAM), or the memory may include a non-volatile memory such as a read-only memory (ROM), a flash memory, a hard disk drive (HDD), or a solid-state drive (SSD), or the memory may include a combination of the foregoing types of memories.

Communications interface 103. The communications interface 103 is an interface circuit used by the server 100 to communicate with another device. The communications interface may be a structure that has a transceiver function, such as a transceiver or a transceiver circuit. For example, through the communications interface 103, the management service function unit may receive a registration request, a management service query request, a management service update request, a management service deregistration request, or the like of the management function unit, and make a response.

Figure 3:
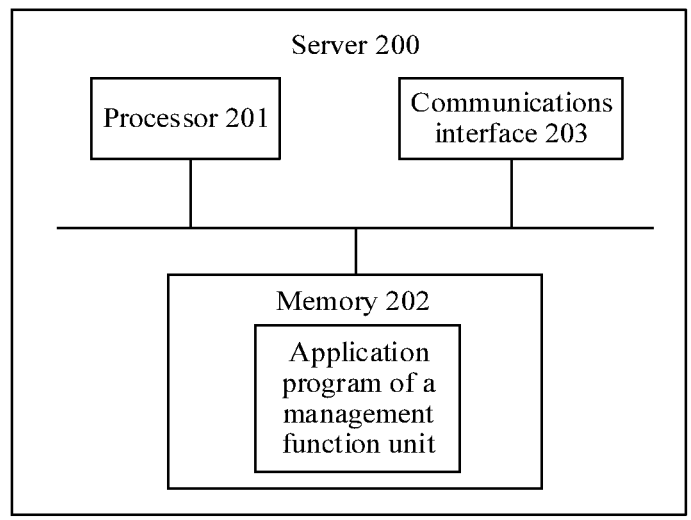
FIG. 3 is a schematic hardware diagram of a server integrated with a management function unit according to an embodiment of the present disclosure.

In this embodiment of the present disclosure, the management function unit may be integrated into a server to implement a function of the management function unit. The following specifically describes, with reference to FIG. 3, components of a server 200 integrated with a management function unit according to an embodiment of the present disclosure. As shown in FIG. 3, the server 200 may include a processor 201, a memory 202, a communications interface 203, and the like.

Processor 201. The processor 201 is a core component of the server 200, and is configured to run an operating system of the server 200 and an application program (including a system application program and a third-party application program) on the server 200.

In this embodiment of the present disclosure, the processor 201 may be specifically a CPU, a general purpose processor, a DSP, an ASIC, an FPGA or another programmable logic device, a transistor logic device, a hardware component, or any combination thereof. The processor 101 can implement or execute various examples of logical blocks, modules, and circuits described with reference to content disclosed in the embodiments of the present disclosure. Alternatively, the processor may be a combination for implementing a computing function, for example, a combination including one or more microprocessors or a combination of a DSP and a microprocessor.

Memory 202. The memory 202 may be configured to store a software program and module. The processor 201 runs the software program and module that are stored in the memory 102, to execute various function applications of the server 200 and process data. The memory 202 may include one or more computer-readable storage media. The memory 202 includes a program storage area and a data storage area. The program storage area may store an operating system, an application program required by at least one function (for example, an application program of the management function unit), and the like. The data storage area may store data created by the server 200. In this embodiment of the present disclosure, the memory 202 may specifically include a volatile memory, for example, a RAM. The memory may also include a non-volatile memory, for example, a ROM, a flash memory, an HDD, or an SSD. The memory may further include a combination of the foregoing types of memories.

Communications interface 203. The communications interface 203 is an interface circuit used by the server 200 to communicate with another device. The communications interface may be a structure that has a transceiver function, such as a transceiver or a transceiver circuit. For example, through the communications interface 203, a registration request and a management service query request are sent to a management service function unit, and a registration acknowledgement message, description information of a management service, and the like that are sent by the management service function unit are received.

Optionally, the management service function unit and the management function unit may be separately integrated into different servers, or may be integrated into a same server. This is specifically determined according to an actual situation, and is not limited in this embodiment of the present disclosure.

The following describes in detail the management service management method provided in the embodiments of the present disclosure from perspectives of interaction between the management service function unit and the first management function unit and interaction between the management service function unit and the second management function unit.

Figure 4:
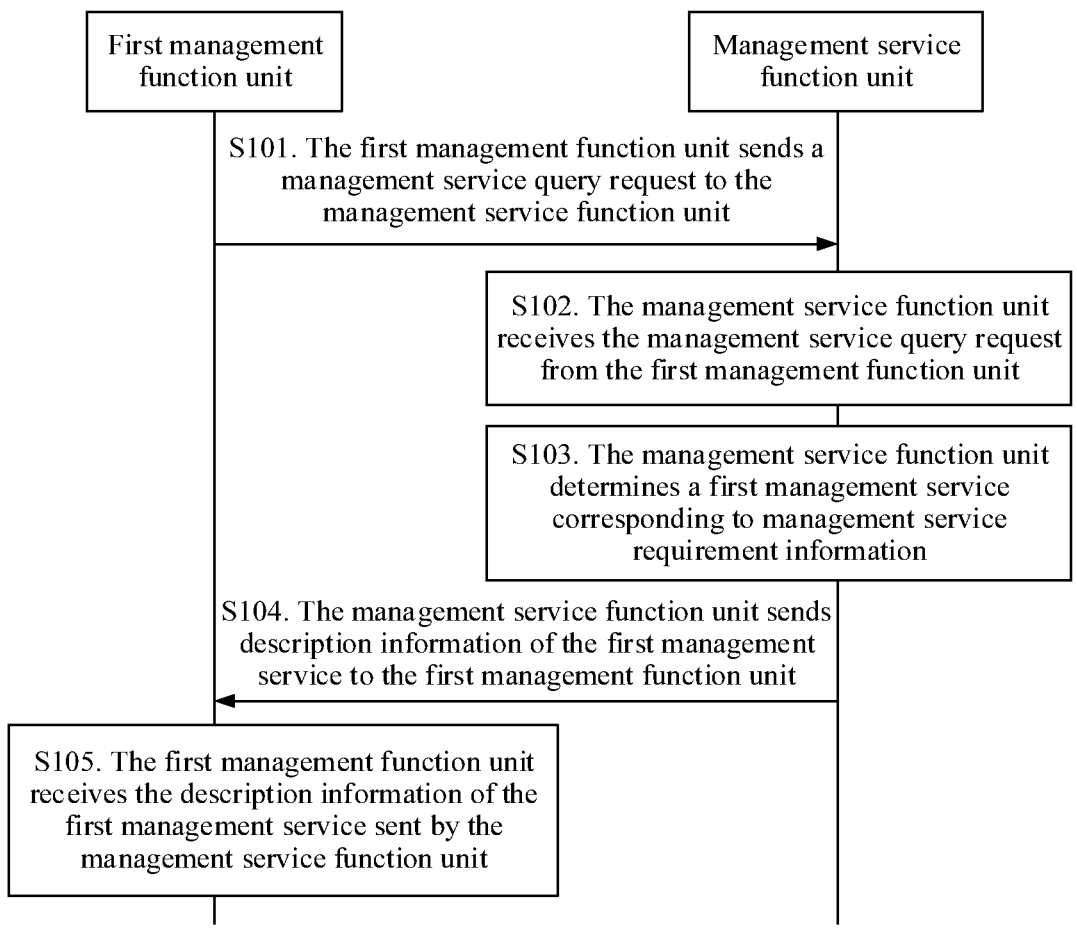
FIG. 4 is a first schematic diagram of a management service management method according to an embodiment of the present disclosure.

First, with reference to the foregoing network management system, on a basis that the management service function unit has stored the description information of the first management service corresponding to the second management function unit, as shown in FIG. 4, a management service management method provided in an embodiment of the present disclosure may include S101 to S105.

S101. The first management function unit sends a management service query request to the management service function unit.

The management service query request carries management service requirement information, and the management service requirement information includes at least one of the following requirement information of an operation, requirement information of a managed object, and requirement information of management data.

In this embodiment of the present disclosure, the management service requirement information includes a feature of description information of a management service that needs to be obtained by the first management function unit, to instruct to obtain the description information of the corresponding management service. For example, if the management service requirement information is lifecycle management of an access and mobility management function (AMF), the requirement information of the managed object is an AMF, and the requirement information of the operation is lifecycle management.

S102. The management service function unit receives the management service query request from the first management function unit.

S103. The management service function unit determines the first management service corresponding to the management service requirement information.

The first management service is a management service corresponding to the second management function unit.

In this embodiment of the present disclosure, the management service function unit may store instance information of a plurality of management function units, and each management function unit may correspond to a plurality of management services. In this way, the management service function unit may store description information of the plurality of management services (specifically, the description information of the management services is stored in the management service function unit by using a registration procedure of the management function unit on the management service function unit). After receiving the management service requirement information sent by the first management function unit, the management service function unit determines, based on the management requirement information, a management service whose description information needs to be obtained by the first management function unit, so that the description information of the management service that meets a requirement can be sent to the first management function unit.

Specifically, the management service function unit determines the first management service corresponding to the management service requirement information. To be specific, the management service function unit determines, based on the management service requirement information, that the first management service is a management service that meets the management service requirement information sent by the first management function unit, to determine the description information of the first management service.

S104. The management service function unit sends the description information of the first management service to the first management function unit.

The description information of the first management service includes description information of the operation, description information of the managed object, and description information of the management data that correspond to the first management service.

In this embodiment of the present disclosure, the description information of the operation corresponding to the first management service is used to indicate operations that can be supported by the first management service. The description information of the operation corresponding to the first management service includes operation indication information or operation information, and the operation indication information is used to indicate the operation information. The operation indication information includes a type of the first management service, and the type of the first management service includes at least one of the following a lifecycle management service, a fault management service, or a performance management service.

Operation information indicated by the lifecycle management service includes at least one of the following creating a managed object, deleting a managed object, querying a managed object, modifying a managed object, subscribing to a notification, unsubscribing from a notification, or notification (including notifying creation of a managed object, notifying deletion of a managed object, and notifying modification of an attribute value of a managed object).

Operation information indicated by the fault management service includes at least one of the following reading an alarm list (get alarm list), subscribing to an alarm notification (subscribe), unsubscribing from an alarm notification (unsubscribe), notifying a new alarm (notify new alarm), notifying rebuilding of an alarm list (notify alarm list rebuilt), notifying an alarm change (notify change alarm), acknowledging an alarm (acknowledge alarms), clearing an alarm (clear alarms), notifying a state change (notify ack state changed), notifying alarm clearance (notify cleared alarm), or unacknowledging an alarm (unacknowledge alarms).

Operation information indicated by the performance management service includes at least one of the following creating a measurement job (create measurement job), stopping a measurement job (stop measurement job), reading a measurement job (list measurement jobs), notifying file preparation (notify file preparation error), reading an available file (notify file ready), notifying a file preparation error (list available files), subscribing to a notification, or unsubscribing from a notification.

Optionally, the type of the first management service may alternatively be at least one of the following a lifecycle management service, a fault data reporting management service, a fault control management service, a measurement job control management service, or a performance data reporting management service. The fault data reporting management service and the fault control management service belong to the fault management service. The measurement job control management service and the performance data reporting management service belong to the performance management service.

The following Table 1 shows an example of a management service type (that is, operation indication information) and operation information corresponding to the management service type.

TABLE 1

| Management Service Type | Operation Information |
|---|---|
| Lifecycle management | Creating a managed object<br>Deleting a managed object<br>Querying a managed object<br>Modifying a managed object<br>Subscribing to/Unsubscribing from a notification<br>Notification |
| Fault data reporting management service | Reading an alarm list<br>Subscribing to/Unsubscribing from an alarm notification<br>Notifying a new alarm or notifying rebuilding of an alarm list<br>Notifying an alarm change |
| Fault control management service | Acknowledging an alarm or clearing an alarm<br>Notifying a state change or notifying alarm clearance<br>Unacknowledging an alarm |
| Measurement job control management service | Creating a measurement job<br>Stopping a measurement job<br>Reading a measurement job |
| Performance data reporting management service | Notifying file preparation<br>Reading an available file<br>Notifying a file preparation error<br>Subscribing to/Unsubscribing from a notification |

In this embodiment of the present disclosure, the description information of the managed object that corresponds to the first management service is used to indicate managed objects that can be supported by the first management service. The description information of the managed object that corresponds to the first management service includes at least one of the following a type of the managed object, a name of the managed object, or a configuration attribute of the managed object. The type of the managed object includes at least one of the following a network slice, a sub-network, a network function, a type of a network slice, a type of a sub-network, or a type of a network function. It may be understood that the sub-network includes a network slice subnet.

The managed object has different types. From a perspective of object granularity perspective, the types of the managed object include a network slice, a sub-network, a network function, and the like. Specifically, when the type of the managed object in the description information of the managed object is a network slice, it indicates that the first management service supports management of the network slice. When the type of the managed object in the description information of the managed object is a sub-network, it indicates that the first management service supports management of the sub-network. When the type of the managed object in the description information of the managed object is a network function, it indicates that the first management service supports management of the network function.

From a perspective of a network type, the types of the managed object include a type of a network slice, a type of a sub-network, a type of a network function, and the like, indicating that the first management service supports management of a network slice, a sub-network, or a network function of a specific type.

The type of the network slice may be any one of the following enhanced mobile broadband (eMBB), ultra-reliable low-latency communication (URLLC), or massive Internet of Things (mIoT). Specifically, if the type of the network slice is eMBB, it indicates that the first management service supports management of a network slice of an eMBB type. If the type of the network slice is URLLC, it indicates that the first management service supports management mIoT of an eMBB network slice.

The type of the sub-network may be any one of the following first types eMBB, URLLC, or mIoT. Alternatively, the type of the sub-network may be any one of the following second types an access network (AN), a core network (CN), a 5G CN (5GC), an evolved packet core (EPC)(that is, a fourth generation (4G) CN), NR (that is, a 5G radio access network), or long term evolution (LTE). Alternatively, the type of the sub-network may be a combination of any one of the first types and any one of the second types.

For example, that the second types include 5GC, EPC, NR, and LTE is used as an example. The following Table 2 shows an example of the type of the sub-network.

TABLE 2

| Second Type | First Type | | |
|---|---|---|---|
| | eMBB | URLLC | mIoT |
| 5GC | 5GC, eMBB | 5GC, URLLC | 5GC, mIoT |
| EPC | EPC, eMBB | EPC, URLLC | EPC, mIoT |
| NR | NR, eMBB | NR, URLLC | NR, mIoT |
| LTE | LTE, eMBB | LTE, URLLC | LTE, mIoT |

For example, 5GC, eMBB and the like in Table 2 indicate a combination result of the second types and the first types of the sub-network. Specifically, that the type of the sub-network is 5GC, eMBB indicates a sub-network of an eMBB type in a 5G network. If the type of the sub-network is 5GC, eMBB, it indicates that the first management service supports management of the sub-network of the eMBB type in the 5G network.

The type of the network function indicates a network function supported by the first management service. Specifically, the type of the network function is any one of the following an AMF, a session management function (SMF), a user plane function (UPF), and a network repository function (NRF), an unstructured data storage function (UDSF), a network exposure function (NEF), a policy and charging rules function (PCRF), a network slice selection function (NSSF), a base station centralized unit control plane (CUCP), a base station centralized unit user plane (CUUP), a base station distributed unit (DU), a next generation NodeB (gNB), or an evolved NodeB (eNB).

In this embodiment of the present disclosure, the description information of the management data corresponding to the first management service is used to indicate management data supported by the first management service, and the description information of the management data includes at least one of the following network performance data or network fault data. The network performance data may specifically include a quantity of users registered with a network/network slice instance, an uplink/downlink throughput rate, an uplink packet loss rate, and uplink/downlink physical resource block utilization of the network/network slice instance, and the like. The network fault data includes a fault occurrence time, a fault occurrence cause, a fault impact degree, and the like. The network fault data may further include different types of fault data. The types of the network fault data include a key performance indicator (KPI) threshold exceeding a specified threshold, a communication link interruption, a board fault, performance attenuation, network congestion, an Internet protocol (IP) address conflict, and the like.

Optionally, the description information of the first management service may further include at least one of the following user description information of the first management service, version description information of the first management service, provider description information of the first management service, or state description information of the first management service.

Optionally, the description information of the first management service may further include identification information of the second management function unit corresponding to the first management service.

In this embodiment of the present disclosure, the user description information of the first management service is used to indicate a user of the first management service, and the user of the first management service is a management function unit.

Specifically, a granularity of a management service that can be provided by the management function unit may be used to indicate the management function unit (that is, the user of the first management service). To be specific, the user description information of the first management service is the granularity of the management service, and the granularity of the management service represents a granularity of a corresponding managed object. For example, a management service at a network slice granularity indicates that a granularity of a managed object corresponding to the management service is a network slice. The granularity of the management service includes at least one of the following a network function granularity, a network slice granularity, or a sub-network granularity. This may be understood as the user of the first management service may be a management function unit that provides a management service at a network function granularity, a management function unit that provides a management service at a network slice granularity, or a management function unit that provides a management service at a sub-network granularity.

For example, assuming that the user description information of the first management service is the granularity of the management service, and the granularity of the management service is a network slice, all management function units that can provide a management service for (perform management on) the network slice are users of the first management service.

In this embodiment of the present disclosure, a type of a management service that can be provided by the management function unit may be used to indicate the management function unit (that is, the user of the first management service). To be specific, the user description information of the first management service is the type of the management service, and the type of the management service includes at least one of the following a lifecycle management service of a network slice, a fault data reporting management service of a network slice, a fault control management service of a network slice, a measurement job control management service of a network slice, a performance data reporting management service of a network slice, a lifecycle management service of a sub-network, a fault data reporting management service of a sub-network, a fault control management service of a sub-network, a measurement job control management service of a sub-network, a performance data reporting management service of a sub-network, a lifecycle management service of a network function, a fault data reporting management service of a network function, a fault control management service of a network function, a measurement job control management service of a network function, or a performance data reporting management service of a network function.

In this embodiment of the present disclosure, a provider of the management function unit may alternatively be used to indicate the user of the first management service. To be specific, the user description information of the first management service is provider information of the management function unit, and the provider of the management function unit may be a supplier or an operator of the management function unit. For example, assuming that the user description information of the first management service is a first supplier, all management function units provided by the first supplier are users of the first management service.

In this embodiment of the present disclosure, location information of the management function unit may alternatively be used to indicate the user of the first management service. To be specific, the user description information of the first management service is the location information of the management function unit. For example, assuming that the user description information of the first management service is a first area, all management function units in the first area are users of the first management service.

In this embodiment of the present disclosure, identification information of the management function unit may alternatively be used to indicate the user of the first management service. To be specific, the user description information of the first management service is the identification information of the management function unit, the identification information of the management function unit may be an identity (ID) or an IP address of the management function unit, and the ID of the management function unit may be a domain name (DN) of the management function unit. For example, assuming that the user description information of the first management service is a first ID, a management function unit indicated by the first ID is the user of the first management service.

Provider information of the first management service in the description information of the first management service may be identification information of the second management function unit or a supplier of the second management function unit, the identification information of the second management function unit may include an ID or an IP address of the second management function unit, and the ID of the second management function unit may be a DN of the second management function.

State information of the first management service in the description information of the first management service includes an available state or an unavailable state.

Optionally, in this embodiment of the present disclosure, the management service function unit may send all or some of the description information of the first management service to the first management function unit. This is not specifically limited in the embodiments of the present disclosure.

S105. The first management function unit receives the description information of the first management service sent by the management service function unit.

In this embodiment of the present disclosure, after obtaining the description information of the first management service (the first management service is a management service provided by the second management function unit), the first management function unit initiates a management service invocation request to the second management function unit. The management service invocation request is used to instruct the second management function unit to perform an operation, and the management service invocation request carries the description information of the managed object or the description information of the management data. For example, the first management function unit initiates, to the second management function unit, an invocation request for creating a network slice, so that the second management function unit creates a corresponding network slice based on related information in the management service invocation request.

In conclusion, mutual access to description information of management services can be implemented by using S101 to S105.

Figure 5:
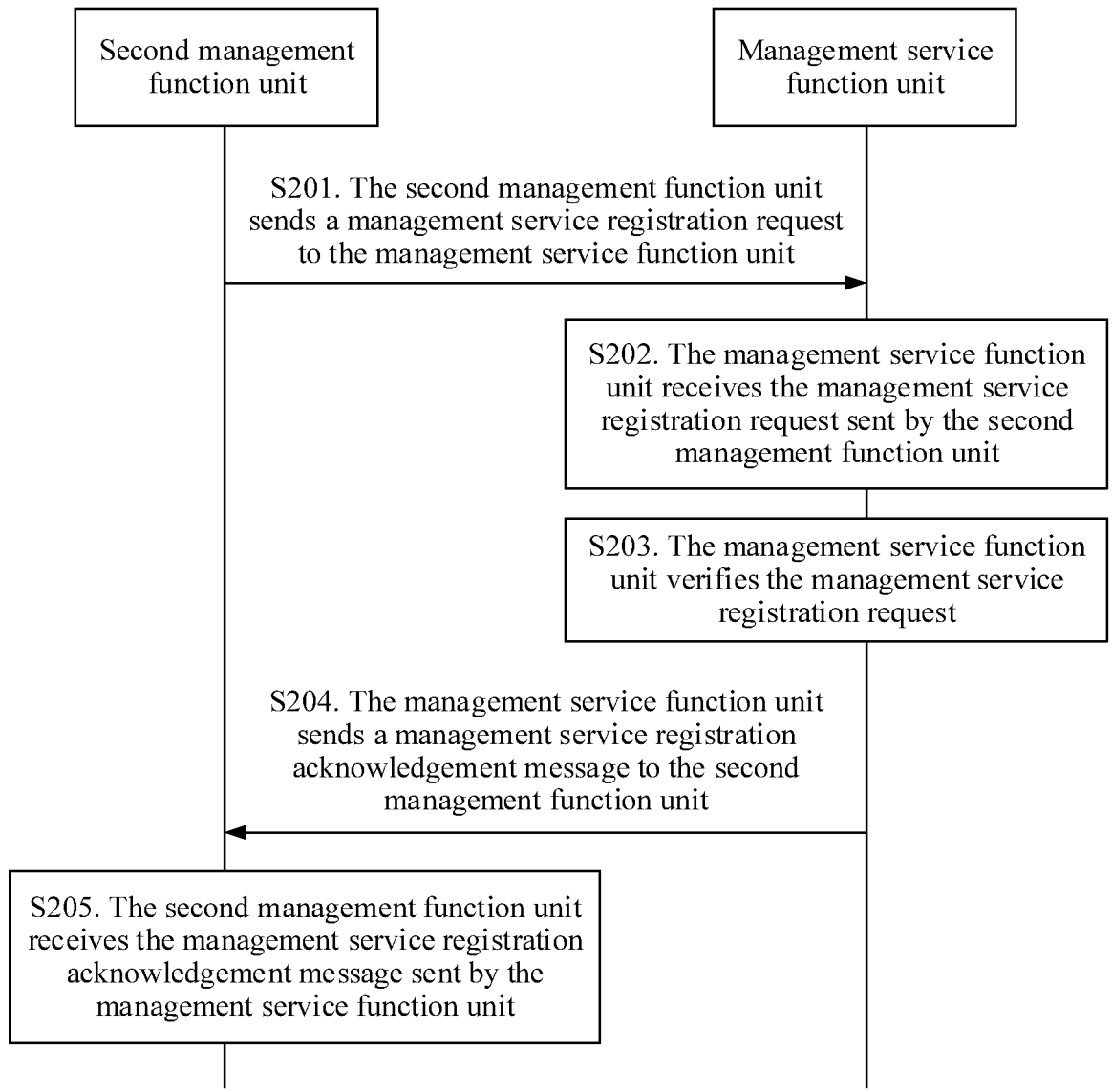
FIG. 5 is a second schematic diagram of a management service management method according to an embodiment of the present disclosure.

As shown in FIG. 5, a management function unit may register (that is, store) description information of a management service corresponding to the management function unit on a management service function unit by using a registration procedure performed on the management service function unit. The first management service of the second management function unit and the first management function unit are used as an example. Before the first management function unit queries the description information of the first management service from the management service function unit (that is, before the management service function unit receives the management service query request from the first management function unit), the management service management method provided in this embodiment of the present disclosure may further include S201 to S205.

S201. The second management function unit sends a management service registration request to the management service function unit.

The management service registration request carries the description information of the first management service, and the management service registration request is used to request to store the description information of the first management service in the management service function unit, and the management service function unit manages the description information of the first management service. For descriptions of the description information of the first management service, refer to the foregoing specific descriptions for S104. Details are not described herein again.

S202. The management service function unit receives the management service registration request sent by the second management function unit.

S203. The management service function unit verifies the management service registration request.

In this embodiment of the present disclosure, the management service function unit verifies whether the first management service is a valid management service. If the first management service is valid, the management service function unit stores the description information of the first management service in the management service function unit. If the first management service is invalid, the management service function unit discards the description information of the first management service.

S204. The management service function unit sends a management service registration acknowledgement message to the second management function unit.

After storing the description information of the first management service in the management service function unit, the management service function unit sends the management service registration acknowledgement message to the second management function unit, to notify the second management function unit that the first management service corresponding to the second management function unit is successfully registered with the management service function unit.

S205. The second management function unit receives the management service registration acknowledgement message sent by the management service function unit.

Optionally, in this embodiment of the present disclosure, the management service registration request may further carry identification information of the first management service, or the registration request may not carry identification information of the first management service, and the identification information of the first management service is an ID of the first management service.

If the management service registration request carries an identifier of the first management service, in this embodiment of the present disclosure, in a process in which the first management function unit queries the description information of the first management service, the management service function unit may further send the identifier of the first management service to the first management function unit.

Optionally, when sending the description information of the first management service to the first management function unit, the management service function unit may also carry the identifier of the first management service. Alternatively, the management service function unit may separately send the description information of the first management service and the identifier of the first management service by using different messages. This is not limited in the embodiments of the present disclosure.

If the management service registration request does not carry the identifier of the first management service, the management service management method provided in this embodiment of the present disclosure may further include allocating, by the management service function unit, the identifier of the first management service to the first management service. In addition, in S204, the management service registration acknowledgement message sent by the management service function unit to the second management function unit carries the identifier of the first management service. Similarly, in the process in which the first management function unit queries the description information of the first management service, the management service function unit may also send the identifier of the first management service to the first management function unit.

The identifier of the first management service may be an ID of the first management service, and the ID of the first management service may be a DN of the first management service.

Optionally, after the second management function unit completes registration of the first management service on the management service function unit, the management service function unit may further configure an association relationship between the second management function unit and the first management service on the first management function unit. In this way, after obtaining the description information of the first management service, the first management function unit may determine that the first management function unit needs to initiate a management service invocation request to the second management function unit corresponding to the first management service.

In conclusion, the registration process of the first management service on the management service function unit can be implemented by using S201 to S205, so that another management function unit can query the description information of the first management service on the management service function unit, to flexibly manage a management service.

In the management service management method provided in this embodiment of the present disclosure, the description information of the management service corresponding to the second management function unit may be stored in the management service function unit, and then the first management function unit may send the management service query request to the management service function unit, to query the description information of the first management service corresponding to the second management function unit. Because the management service function unit may manage description information of management services, and management function units may mutually access the description information of the management services by using the management service function unit, the management services can be flexibly managed.

Figure 6:
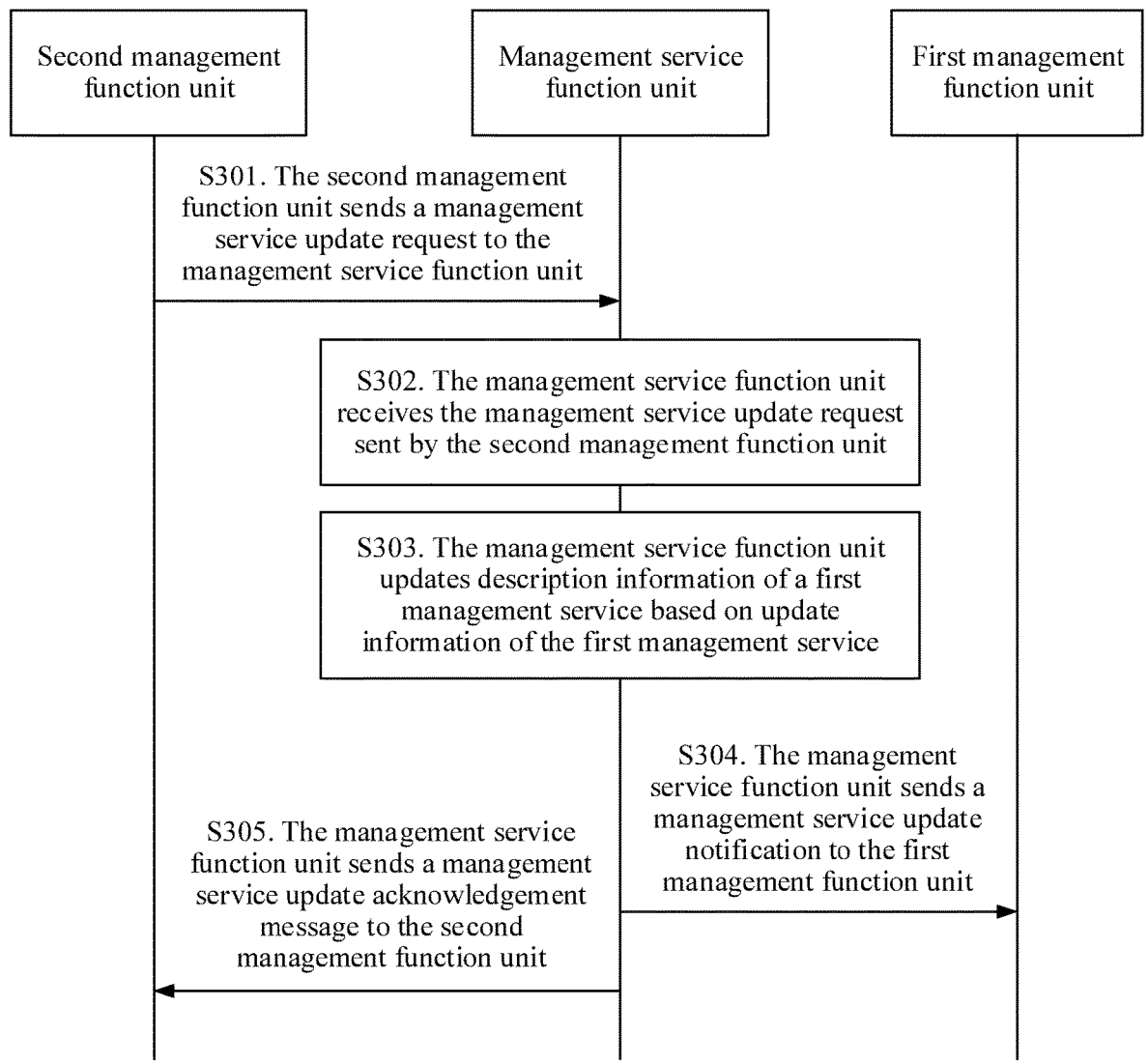
FIG. 6 is a third schematic diagram of a management service management method according to an embodiment of the present disclosure.

As shown in FIG. 6, after the second management function unit completes registration of the first management service on the management service function unit, when the description information of the first management service changes, the management service management method provided in this embodiment of the present disclosure may further include S301 to S305.

S301. The second management function unit sends a management service update request to the management service function unit.

The management service update request carries the identifier of the first management service and update information of the first management service, and the update information of the first management service includes at least one piece of information in the description information of the first management service. To be specific, the update information of the first management service includes at least one of the following the description information of the operation, the description information of the managed object, or the description information of the management data that corresponds to the first management service, the user description information of the first management service, the version description information of the first management service, the provider description information of the first management service, or the state description information of the first management service.

S302. The management service function unit receives the management service update request sent by the second management function unit.

S303. The management service function unit updates the description information of the first management service based on the update information of the first management service.

In this embodiment of the present disclosure, when the description information of the first management service changes (for example, information is added to the description information or the description information is deleted), the second management function unit corresponding to the first management service may send the update information of the first management service to the management service function unit, so that the management service function unit can update the description information of the first management service in the management service function unit.

S304. The management service function unit sends a management service update notification to the first management function unit.

The management service update notification carries the identifier of the first management service and the update information of the first management service.

In this embodiment of the present disclosure, when the description information of the first management service changes, the management service function unit may instruct a user (that is, the first management function unit) of the description information of the first management service to send a management service update notification, and the management service update notification carries the update information of the first management service.

S305. The management service function unit sends a management service update acknowledgement message to the second management function unit.

In conclusion, the description information of the first management service in the management service function unit may be updated by using S301 to S305.

Figure 7:
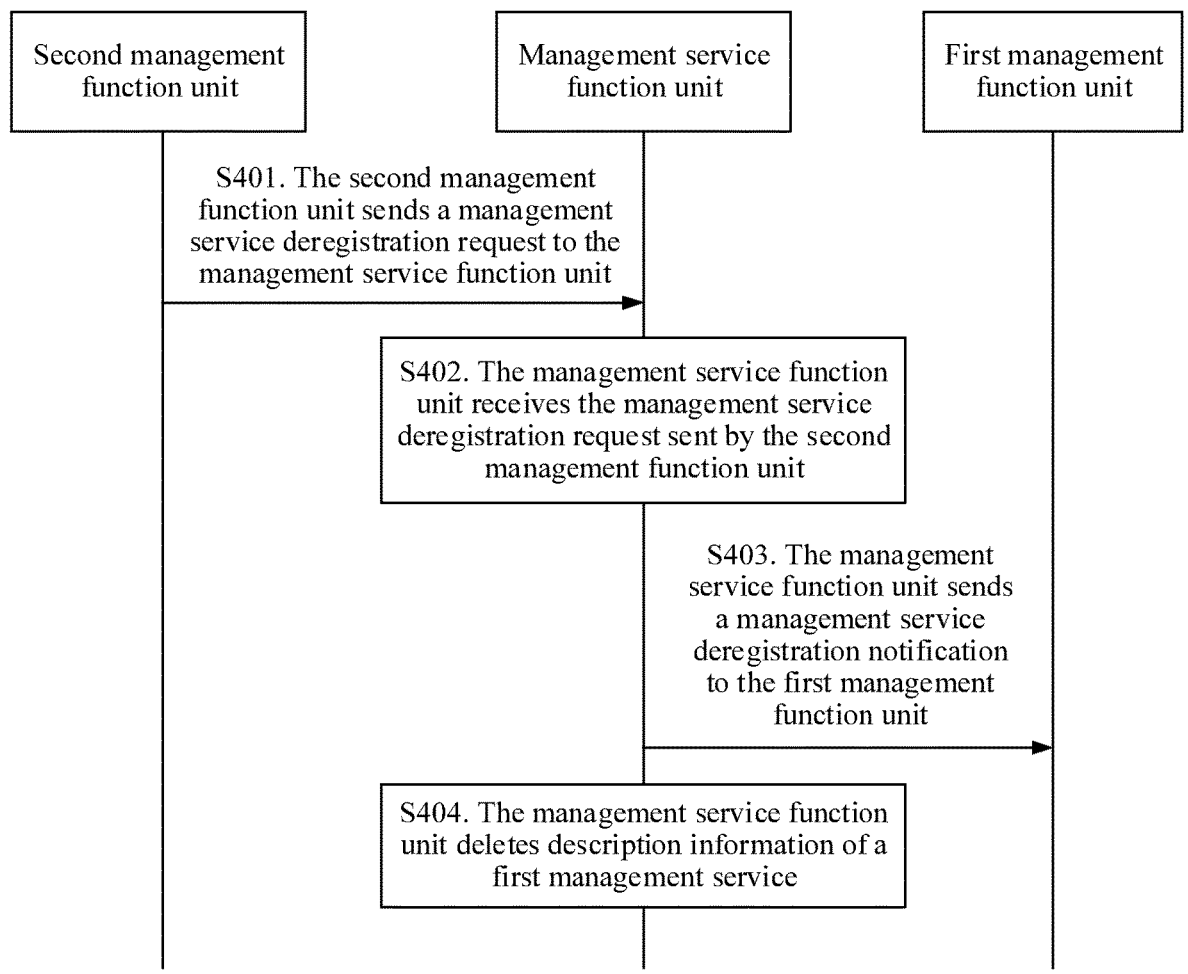
FIG. 7 is a fourth schematic diagram of a management service management method according to an embodiment of the present disclosure.

As shown in FIG. 7, the management service management method provided in this embodiment of the present disclosure may further include S401 to S404.

S401. The second management function unit sends a management service deregistration request to the management service function unit.

The management service deregistration request carries the identification information of the first management service.

S402. The management service function unit receives the management service deregistration request sent by the second management function unit.

S403. The management service function unit sends a management service deregistration notification to the first management function unit.

In this embodiment of the present disclosure, the management service function unit sends the management service deregistration notification to the first management function unit, to notify the user (that is, the first management function unit) of the description information of the first management service that the first management service is invalid and that the description information of the first management service cannot be used.

S404. The management service function unit deletes the description information of the first management service.

In conclusion, the first management service in the management service function unit may be deregistered by using S401 to S404.

Optionally, in this embodiment of the present disclosure, because the description information of the first management service cannot be used any longer, the first management function unit may further initiate a new management service query request to the management service function unit, to request the management service function unit to return description information of a new available management service.

The foregoing mainly describes the solutions provided in the embodiments of the present disclosure from a perspective of interaction between network elements. It may be understood that, to implement the foregoing functions, the network elements such as the management service function unit, the first management function unit, and the second management function unit include corresponding hardware structures and/or software modules for performing the functions. A person skilled in the art should easily be aware that, in combination with the examples described in the embodiments disclosed in this specification, units, algorithms, and steps may be implemented by hardware or a combination of hardware and computer software in the embodiments of the present disclosure. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of the present disclosure, the management service function unit, the first management function unit, the second management function unit, and the like may be divided into function modules based on the foregoing method examples. For example, function modules may be obtained through division based on corresponding functions, or at least two functions may be integrated into one processing module. The integrated module may be implemented in a form of hardware, or may be implemented in a form of a software function module. It should be noted that, in the embodiments of the present disclosure, division into modules is an example, is merely logical function division, and may be other division in an actual implementation.

Figure 8:
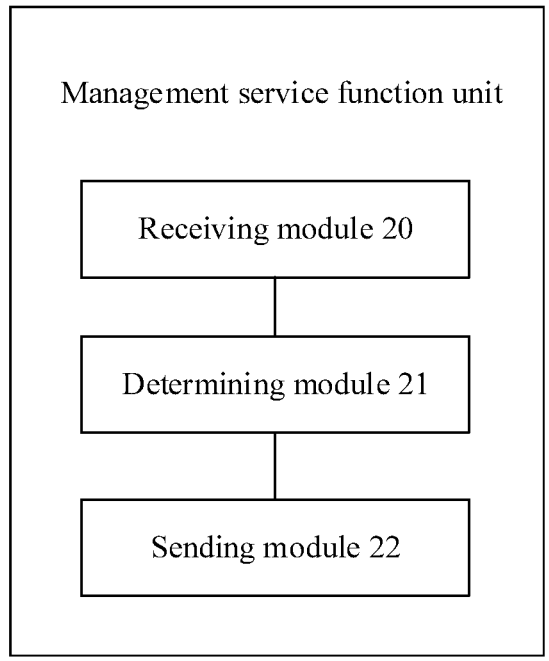
FIG. 8 is a first schematic structural diagram of a management service function unit according to an embodiment of the present disclosure.

When each function module is obtained through division based on each corresponding function, FIG. 8 is a possible schematic structural diagram of the management service function unit in the foregoing embodiments. As shown in FIG. 8, the management service function unit may include a receiving module 20, a determining module 21, and a sending module 22. The receiving module 20 may be used by the management service function unit to perform S102, S202, S302, and S402 in the foregoing method embodiments. The determining module 21 may be configured to support the management service function unit in performing S103, S203, S303, and S404 in the foregoing method embodiments. The sending module 22 may be configured to support the management service function unit in performing S104, S204, S304, and S403 in the foregoing embodiments.

All related content of the steps in the foregoing method embodiments may be cited in function descriptions of the corresponding function modules. Details are not described herein again.

Figure 9:
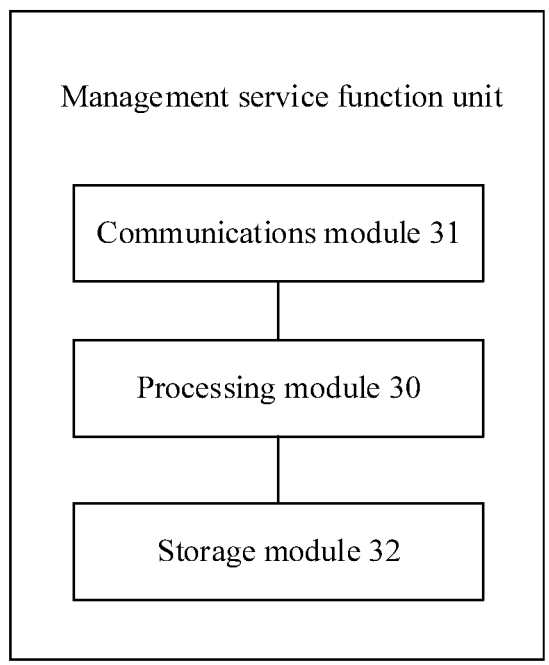
FIG. 9 is a second schematic structural diagram of a management service function unit according to an embodiment of the present disclosure.

When integrated units are used, FIG. 9 is a possible schematic structural diagram of the management service function unit in the foregoing embodiments. As shown in FIG. 9, the management service function unit may include a processing module 30 and a communications module 31. The processing module 30 may be configured to control and manage an action of the management service function unit. For example, the processing module 30 may be configured to support the management service function unit in performing related steps performed by the determining module 21, and/or another process in the technology described in this specification. The communications module 31 may be configured to support the management service function unit in communicating with another network entity. For example, the communications module 31 may be configured to support the management service function unit in performing related steps performed by the receiving module 20 and the sending module 22. Optionally, as shown in FIG. 9, the management service function unit may further include a storage module 32, configured to store program code and data of the management service function unit.

The processing module 30 may be a processor or a controller, the communications module 31 may be a transceiver, a transceiver circuit, a communications interface, or the like, and the storage module 32 may be a memory. When the processing module 30 is a processor, the communications module 31 is a transceiver, and the storage module 32 is a memory, the processor, the transceiver, and the memory may be connected by using a bus. The bus may be a peripheral component interconnect (PCI) bus, an extended industry standard architecture (EISA) bus, or the like. The bus may be classified into an address bus, a data bus, a control bus, and the like.

Figure 10:
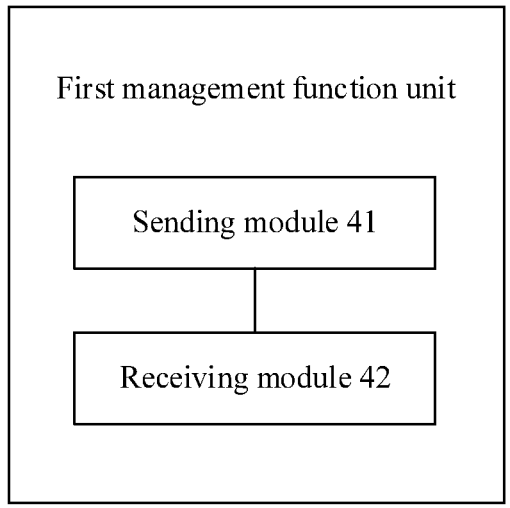
FIG. 10 is a first schematic structural diagram of a first management function unit according to an embodiment of the present disclosure.

When each function module is obtained through division based on each corresponding function, FIG. 10 is a possible schematic structural diagram of the first management function unit in the foregoing embodiments. As shown in FIG. 10, the first management function unit may include a sending module 41 and a receiving module 42. The sending module 41 may be configured to support the first management function unit in performing S101 in the foregoing method embodiment. The receiving module 42 may be configured to support the first management function unit in performing S105 in the foregoing method embodiment. All related content of the steps in the foregoing method embodiments may be cited in function descriptions of the corresponding function modules. Details are not described herein again.

Figure 11:
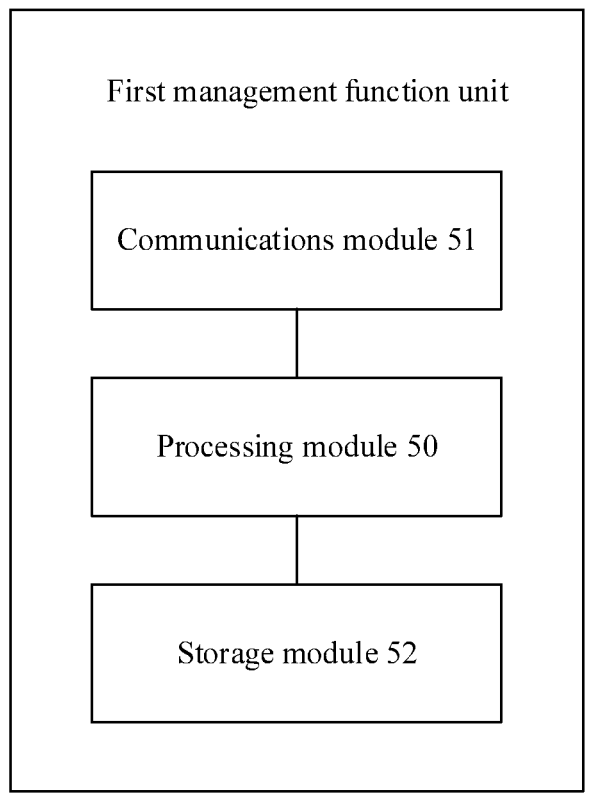
FIG. 11 is a second schematic structural diagram of a first management function unit according to an embodiment of the present disclosure.

When integrated units are used, FIG. 11 is a possible schematic structural diagram of the first management function unit in the foregoing embodiments. As shown in FIG. 11, the first management function unit may include a processing module 50 and a communications module 51. The processing module 50 may be configured to control and manage an action of the first management function unit, and/or configured to perform another process in the technology described in this specification. The communications module 51 may be configured to support the first management function unit in communicating with another network entity. For example, the communications module 51 may be configured to support the first management function unit in performing related steps performed by the sending module 41 and the receiving module 42. Optionally, as shown in FIG. 11, the first management function unit may further include a storage module 52, configured to store program code and data of the first management function unit.

The processing module 50 may be a processor or a controller, the communications module 51 may be a transceiver, a transceiver circuit, a communications interface, or the like, and the storage module 52 may be a memory. When the processing module 50 is a processor, the communications module 51 is a transceiver, and the storage module 52 is a memory, the processor, the transceiver, and the memory may be connected by using a bus. The bus may be a PCI bus, an EISA bus, or the like. The bus may be classified into an address bus, a data bus, a control bus, and the like.

Figure 12:
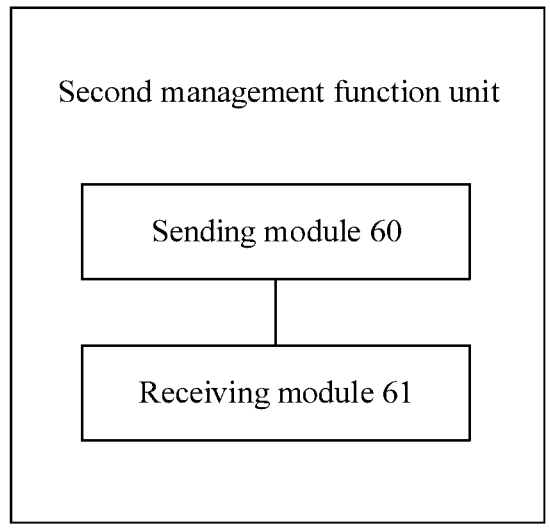
FIG. 12 is a first schematic structural diagram of a second management function unit according to an embodiment of the present disclosure.

When each function module is obtained through division based on each corresponding function, FIG. 12 is a possible schematic structural diagram of the second management function unit in the foregoing embodiments. As shown in FIG. 12, the second management function unit may include a sending module 60 and a receiving module 61. The sending module 60 may be configured to support the second management function unit in performing S201, S301, and S401 in the foregoing method embodiments. The receiving module 61 may be configured to support the second management function unit in performing S205 in the foregoing method embodiment. All related content of the steps in the foregoing method embodiments may be cited in function descriptions of the corresponding function modules. Details are not described herein again.

Figure 13:
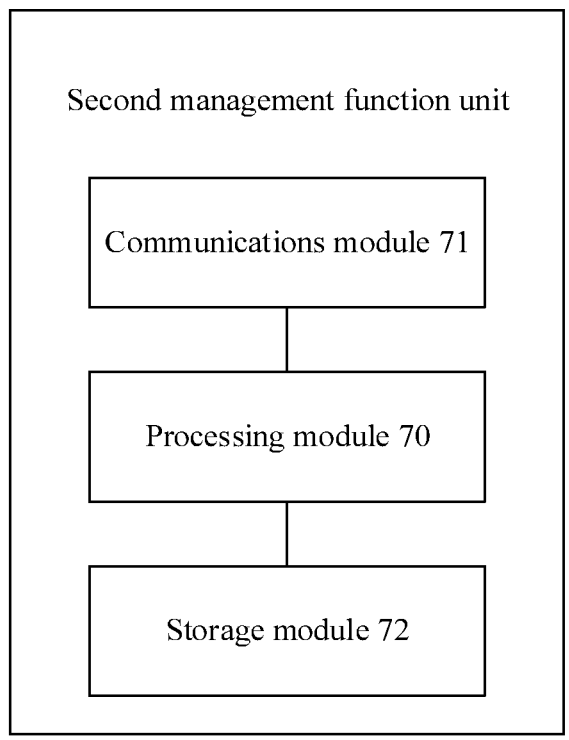
FIG. 13 is a second schematic structural diagram of a second management function unit according to an embodiment of the present disclosure.

When integrated units are used, FIG. 13 is a possible schematic structural diagram of the second management function unit in the foregoing embodiments. As shown in FIG. 13, the second management function unit may include a processing module 70 and a communications module 71. The processing module 70 may be configured to control and manage an action of the second management function unit. The communications module 71 may be configured to support the second management function unit in communicating with another network entity. For example, the communications module 71 may be configured to support the second management function unit in performing related steps performed by the sending module 60 and the receiving module 61 in the foregoing method embodiments and other steps in the foregoing method embodiments. Optionally, as shown in FIG. 13, the second management function unit may further include a storage module 72, configured to store program code and data of the second management function unit.

The processing module 70 may be a processor or a controller, the communications module 71 may be a transceiver, a transceiver circuit, a communications interface, or the like, and the storage module 72 may be a memory. When the processing module 70 is a processor, the communications module 71 is a transceiver, and the storage module 72 is a memory, the processor, the transceiver, and the memory may be connected by using a bus. The bus may be a PCI bus, an EISA bus, or the like. The bus may be classified into an address bus, a data bus, a control bus, and the like.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instructions are loaded and executed on the computer, all or some of the procedures or functions according to the embodiments of the present disclosure are generated. The computer may be a general purpose computer, a dedicated computer, a computer network, or another programmable apparatus. The computer instructions may be stored in a computer-readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a magnetic disk, or a magnetic tape), an optical medium (for example, a digital video disc (DVD)), a semiconductor medium (for example, a SSD), or the like.

According to foregoing descriptions about implementations, it may be clearly understood by a person skilled in the art that, for the purpose of convenient and brief description, division of the foregoing function modules is used as an example for description. In an actual application, the functions may be assigned to different function modules for implementation as required. In other words, an inner structure of an apparatus is divided into different function modules to implement all or some of the functions described above. For a specific working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated units may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to another approach, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a flash memory, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A management service management method comprising:
   sending, by a first management function apparatus to a management service function apparatus, a management service query request comprising management service requirement information, wherein the management service requirement information comprises at least one of first requirement information of an operation, second requirement information of a managed object, or third requirement information of management data;
   receiving, by the management service function apparatus from the first management function apparatus, the management service query request;
   determining, by the management service function apparatus, a first management service corresponding to the management service requirement information;
   sending, by the management service function apparatus to the first management function apparatus, first description information of the first management service, wherein the first description information comprises second description information of the operation, third description information of the managed object, and provider description information of the first management service, wherein the second description information comprises operation indication information, wherein the operation indication information comprises a type of the first management service, wherein the type of the first management service comprises a fault management service, and wherein third operation information indicated by the fault management service comprises reading an alarm list; and
   receiving, by the first management function apparatus from the management service function apparatus, the first description information.

2. The management service management method of claim 1, wherein before receiving the management service query request, the management service management method further comprises receiving, by the management service function apparatus from a second management function apparatus, a management service registration request comprising the first description information.

3. The management service management method of claim 2, further comprising sending, by the management service function apparatus to the first management function apparatus, an identifier of the first management service when the management service registration request comprises the identifier.

4. The management service management method of claim 3, further comprising receiving, by the management service function apparatus from the second management function apparatus, a management service update request comprising the identifier and update information of the first management service, wherein the update information comprises a piece of information from the first description information.

5. The management service management method of claim 2, wherein after receiving the management service registration request, the management service management method further comprises:
   allocating, by the management service function apparatus to the first management service, an identifier of the first management service; and
   sending, by the management service function apparatus to the first management function apparatus, the identifier.

6. The management service management method of claim 1, wherein the first description information further comprises fourth description information of the management data, user description information of the first management service, version description information of the first management service, or state description information of the first management service.

7. The management service management method of claim 6, wherein the fourth description information comprises network performance data or network fault data.

8. The management service management method of claim 1, wherein the second description information further comprises first operation information, wherein the operation indication information indicates the first operation information, wherein the type of the first management service further comprises a lifecycle management service or a performance management service, wherein second operation information indicated by the lifecycle management service comprises creating the managed object, deleting the managed object, querying the managed object, modifying the managed object, subscribing to a first notification, unsubscribing from the first notification, notifying creation of the managed object, notifying deletion of the managed object, or notifying modification of an attribute value of the managed object, wherein the third operation information further comprises subscribing to an alarm notification, unsubscribing from the alarm notification, notifying a new alarm, notifying rebuilding of the alarm list, notifying an alarm change, acknowledging an alarm, clearing the alarm, notifying a state change, notifying alarm clearance, or unacknowledging the alarm, and wherein fourth operation information indicated by the performance management service comprises creating a measurement job, stopping the measurement job, reading the measurement job, notifying file preparation, reading an available file, notifying a file preparation error, subscribing to a second notification, or unsubscribing from the second notification.

9. The management service management method of claim 8, wherein the second operation information comprises creating the managed object.

10. The management service management method of claim 8, wherein the fourth operation information comprises creating the measurement job.

11. The management service management method of claim 1, wherein the third description information comprises a type of the managed object, a name of the managed object, or a configuration attribute of the managed object, and wherein the type of the managed object comprises a network slice, a sub-network, a network function, a type of the network slice, a type of the sub-network, or a type of the network function.

12. The management service management method of claim 11, wherein the type of the first management service comprises the network slice.

13. A management service function apparatus comprising:
    a memory configured to store instructions; and
    a processor coupled to the memory and configured to execute the instructions to cause the management service function apparatus to:
       receive, from a first management function apparatus, a management service query request comprising management service requirement information, wherein the management service requirement information comprises at least one of first requirement information of an operation, second requirement information of a managed object, or third requirement information of management data;
       determine a first management service corresponding to the management service requirement information; and send, to the first management function apparatus, first description information of the first management service, wherein the first description information comprises second description information of the operation, third description information of the managed object, and provider description information of the first management service, wherein the second description information comprises operation indication information, wherein the operation indication information comprises a type of the first management service, wherein the type of the first management service comprises a fault management service, and wherein third operation information indicated by the fault management service comprises reading an alarm list.

14. The management service function apparatus of claim 13, wherein before receiving the management service query request, the processor is further configured to execute the instructions to cause the management service function apparatus to receive, from a second management function apparatus, a management service registration request comprising the first description information.

15. The management service function apparatus of claim 14, wherein the processor is further configured to execute the instructions to cause the management service function apparatus to send, to the first management function apparatus, an identifier of the first management service when the management service registration request comprises the identifier.

16. The management service function apparatus of claim 15, wherein the processor is further configured to execute the instructions to cause the management service function apparatus to receive, from the second management function apparatus, a management service update request comprising the identifier and update information of the first management service, and wherein the update information comprises a piece of information from the first description information.

17. The management service function apparatus of claim 14, wherein the processor is further configured to execute the instructions to cause the management service function apparatus to:

allocate an identifier of the first management service to the first management service; and send, to the first management function apparatus, the identifier.

18. The management service function apparatus of claim 13, wherein the first description information further comprises fourth description information of the management data, user description information of the first management service, version description information of the first management service, or state description information of the first management service.

19. The management service function apparatus of claim 18, wherein the fourth description information comprises network performance data or network fault data.

20. The management service function apparatus of claim 13, wherein the second description information further comprises first operation information, wherein the operation indication information indicates the first operation information, wherein the operation indication information comprises a type of the first management service, wherein the type of the first management service further comprises a lifecycle management service or a performance management service, wherein second operation information indicated by the lifecycle management service comprises creating the managed object, deleting the managed object, querying the managed object, modifying the managed object, subscribing to a first notification, unsubscribing from the first notification, notifying creation of the managed object, notifying deletion of the managed object, or notifying modification of an attribute value of the managed object, wherein the third operation information further comprises subscribing to an alarm notification, unsubscribing from the alarm notification, notifying a new alarm, notifying rebuilding of the alarm list, notifying an alarm change, acknowledging an alarm, clearing the alarm, notifying a state change, notifying alarm clearance, or unacknowledging the alarm, and wherein fourth operation information indicated by the performance management service comprises creating a measurement job, stopping the measurement job, reading the measurement job, notifying file preparation, reading an available file, notifying a file preparation error, subscribing to a second notification, or unsubscribing from the second notification.

21. The management service function apparatus of claim 20, wherein the second operation information comprises creating the managed object.

22. The management service function apparatus of claim 13, wherein the third description information comprises a type of the managed object, a name of the managed object, or a configuration attribute of the managed object, and wherein the type of the managed object comprises a network slice, a sub-network, a network function, a type of the network slice, a type of the sub-network, or a type of the network function.

23. A management function apparatus comprising:

a memory configured to store instructions; and a processor coupled to the memory and configured to execute the instructions to cause the management function apparatus to:

send, to a management service function apparatus, a management service query request comprising management service requirement information, wherein the management service requirement information comprises at least one of first requirement information of an operation, second requirement information of a managed object, or third requirement information of management data; and receive, from the management service function apparatus, first description information of a first management service, wherein the first description information comprises second description information of the operation, third description information of the managed object, and provider description information of the first management service, wherein the second description information comprises operation indication information, wherein the operation indication information comprises a type of the first management service, wherein the type of the first management service comprises a fault management service, and wherein third operation information indicated by the fault management service comprises reading an alarm list.

24. The management function apparatus of claim 23, wherein the processor is further configured to execute the instructions to cause the management function apparatus to receive, from the management service function apparatus, a management service update notification comprising an identifier of the first management service and update information of the first management service, and wherein the update information comprises a piece of information from the first description information.

* * * * *